United States Patent
Nagarajan et al.

(10) Patent No.: US 7,697,595 B2
(45) Date of Patent: Apr. 13, 2010

(54) INTERFERENCE CANCELLATION IN VARIABLE CODELENGTH SYSTEMS FOR MULTI-ACCESS COMMUNICATION

(75) Inventors: Vijay Nagarajan, Boulder, CO (US);
Louis L Scharf, Fort Collins, CO (US);
Anand P Narayan, Boulder, CO (US)

(73) Assignee: Tensorcomm Incorporated, Westminster, CO (US)

( * ) Notice: Subject to any disclaimer, the term of this patent is extended or adjusted under 35 U.S.C. 154(b) by 875 days.

(21) Appl. No.: 11/432,580

(22) Filed: May 11, 2006

(65) Prior Publication Data
US 2007/0263704 A1 Nov. 15, 2007

(51) Int. Cl.
*H04B 1/69* (2006.01)
(52) U.S. Cl. ...................... 375/148; 375/130
(58) Field of Classification Search .............. 375/148, 375/347, 342, 267, 152, 349; 370/209, 335, 370/337, 342; 455/132, 137, 138
See application file for complete search history.

(56) References Cited

U.S. PATENT DOCUMENTS

| 6,680,902 | B1 | 1/2004 | Hudson |
| 6,798,737 | B1 * | 9/2004 | Dabak et al. ............... 370/209 |
| 7,099,377 | B2 | 8/2006 | Berens et al. |
| 7,133,435 | B2 | 11/2006 | Papasakellariou et al. |
| 7,209,515 | B2 * | 4/2007 | Kilfoyle et al. ............. 375/152 |
| 2003/0128742 | A1 | 7/2003 | Johnson |
| 2004/0017843 | A1 * | 1/2004 | Fitton et al. ................ 375/148 |
| 2005/0270991 | A1 | 12/2005 | Pan et al. |
| 2006/0209933 | A1 | 9/2006 | Pietraski et al. |
| 2007/0160013 | A1 | 7/2007 | Schotten |

* cited by examiner

*Primary Examiner*—Khai Tran

(57) ABSTRACT

A receiver employs low-rate processing to synthesize the effect of high-rate interference in a received multi-rate signal. Each high-rate subchannel is analyzed on its low-rate descendents to produce symbol estimates for each low-rate symbol interval. The symbol estimates are applied to low-rate descendent subchannels, which are then combined to synthesize the effects of the high-rate interference. An interference canceller processes the synthesized interference with the received signal for producing an interference-cancelled signal. Alternatively, analogous steps may be applied at high-rate to analyze, synthesize, and cancel the effects of low-rate interference in a multi-rate signal.

32 Claims, 8 Drawing Sheets

INTERFERENCE CANCELLATION IN VARIABLE CODELENGTH SYSTEMS FOR MULTI-ACCESS COMMUNICATION

BACKGROUND

1. Field of the Invention

The invention generally relates to the field of signal processing for wireless communication. More specifically the invention is related to spread spectrum interference cancellation.

2. Discussion of the Related Art

In order to efficiently utilize time and frequency in a communication system, multiple-access schemes are used to specify how multiple users or multiple signals share a specified time and frequency allocation. Spread-spectrum techniques may be used to allow multiple users and/or signals to share the same frequency band and time interval simultaneously. Code division multiple access (CDMA) is an example of spread spectrum that assigns a unique code to differentiate each signal and/or user. In a typical CDMA wireless telephony system, a transmitter may use a combination of scrambling codes and covering (i.e., orthogonalizing) codes. For example, each transmitter may be identified by a unique scrambling code or scrambling-code offset. For the purpose of the exemplary embodiments of the invention, a scrambler (which is typically used in a W-CDMA system to scramble data with a scrambling code) is functionally equivalent to a spreader, which is typically used in CDMA2000 and IS-95 systems to spread data using short pseudo-noise (PN) sequences.

A single transmitter may transmit a plurality of signals sharing the same scrambling code, but may distinguish between signals with a unique orthogonalizing code. Orthogonalizing codes encode the signal and provide channelization of the signal. In W-CDMA, orthogonal variable spreading factor (OVSF) codes are used as multiple-access orthogonalizing codes for spreading data. CDMA2000 and IS-95 employ Walsh covering codes for multiple-access coding. These codes are typically designed to have minimal cross-correlation to mitigate interference.

A receiver discriminates multiple received signals by exploiting the properties of spreading and scrambling codes applied to transmissions for each user. The receiver attempts to temporally align the codes of a desired signal with a locally generated replica of spreading and scrambling codes for a particular user. However, the downlink cellular channel typically introduces multipath propagation, which destroys the orthogonality between Walsh channels and produces Multiple-Access Interference (MAI). Even relatively slight multipath effects can introduce cross correlations between codes and cause CDMA systems to be interference-limited. MAI also arises from interfering base stations.

Interference can degrade communications by causing a receiver to incorrectly detect received transmissions, thus increasing a receiver's error floor. Interference may also have other deleterious effects on communications. For example, interference may diminish capacity of a communication system, decrease the region of coverage, and/or decrease maximum data rates. For these reasons, a reduction in interference can improve reception of selected signals while addressing the aforementioned limitations due to interference.

Interference cancellation attempts to suppress intra-cell and inter-cell MAI by estimating and removing the contribution of each interferer from the received signal. Because the capacity of CDMA systems is MAI-limited, estimating and canceling the MAI can increase system capacity. Furthermore, interference cancellation can reduce the signal-to-interference-and-noise ratio (SINR) required to achieve a specific symbol-error-rate (SER) or data throughput for a specific number of users, thereby increasing battery life and decreasing transmission power, increasing the communication range, and/or increasing network capacity.

SUMMARY OF THE INVENTION

CDMA typically employs orthogonalizing codes derived from a Walsh-code tree. CDMA systems that support varied data rates employ codes of different lengths (i.e., codes having different spreading factors) selected from the Walsh-code tree in a manner that is well known in the art. These orthogonalizing codes are selected such that shorter codes (i.e., codes having low spreading factors) are orthogonal to any selected longer code (i.e., codes having a higher spreading factor).

Embodiments of the invention are configured to provide for processing received multi-rate CDMA signals in CDMA systems that employ orthogonalizing codes of different lengths to support varied data rates. For example, embodiments of the invention may be used in WCDMA/HSDPA systems to process channels orthogonalized by OVSF codes.

In cellular spread spectrum systems, a received communication signal comprises at least one signal of interest (SOI), as well as interfering signals and noise. One or more of the interfering signals may be selected for removal. Embodiments of the present invention include methods and receivers for cancelling multiple access interference (MAI) from signals assigned to a user of interest. Specific embodiments may provide for identifying actual or surrogate codes used by signals that are not assigned to the user of interest and cancelling their composite interference from the received signal.

In an embodiment of the invention wherein received signals are analyzed for symbol estimates, which are then weighted and used to synthesize interference effects (called analysis and synthesis), at least one of the analysis and the synthesis may be performed at a single rate. In one embodiment of the invention, high-rate (low spreading factor) channels are processed at the lower rate (higher spreading factor) of a channel employed by a user of interest. In one embodiment of the invention, an intermediate rate is chosen and channels of all rates are processed at the intermediate rate.

Embodiments of the invention may provide for analyzing and synthesizing high-rate interference relative to a signal of interest at a lower rate, such as at the symbol rate of the SOI. In one embodiment, a high-rate subchannel is analyzed on its low-rate descendents to produce a soft decision for each low-rate symbol interval. The low-rate descendents are then combined to synthesize the effects of the high-rate interference at the low-rate of the descendents. Then, for example, the effect of high-rate interference is synthesized at a low rate and used to cancel its interference effects at low rate. The synthesis of high-rate interference at low-rate may include a low-rate Hadamard transform.

Exemplary algorithms employed for analysis and synthesis may be performed by digital signal processors (DSPs), general-purpose programmable processors, application specific circuitry (ASICs), or systems on a chip, such as a DSP, ASIC, and RISC processor on the same chip.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Various functional elements, separately or in combination, depicted in the figures may take the form of a microprocessor, digital signal processor, application specific integrated circuit, field programmable gate array, or other logic circuitry programmed or otherwise configured to operate as described herein. Accordingly, embodiments may take the form of programmable features executed by a common processor or discrete hardware unit.

These and other embodiments of the invention are described with respect to the figures and the following description of the preferred embodiments.

BRIEF DESCRIPTION OF THE DRAWINGS

Embodiments according to the present invention are understood with reference to the flow diagrams of FIGS. 1A, 1B, 1C, 2C, and 5B and the schematic block diagrams of FIGS. 2A, 2B, 3A, 3B, 4A, 4B, 4C, 4D, and 5A.

DESCRIPTION OF THE PREFERRED EMBODIMENTS

Figure 1A:
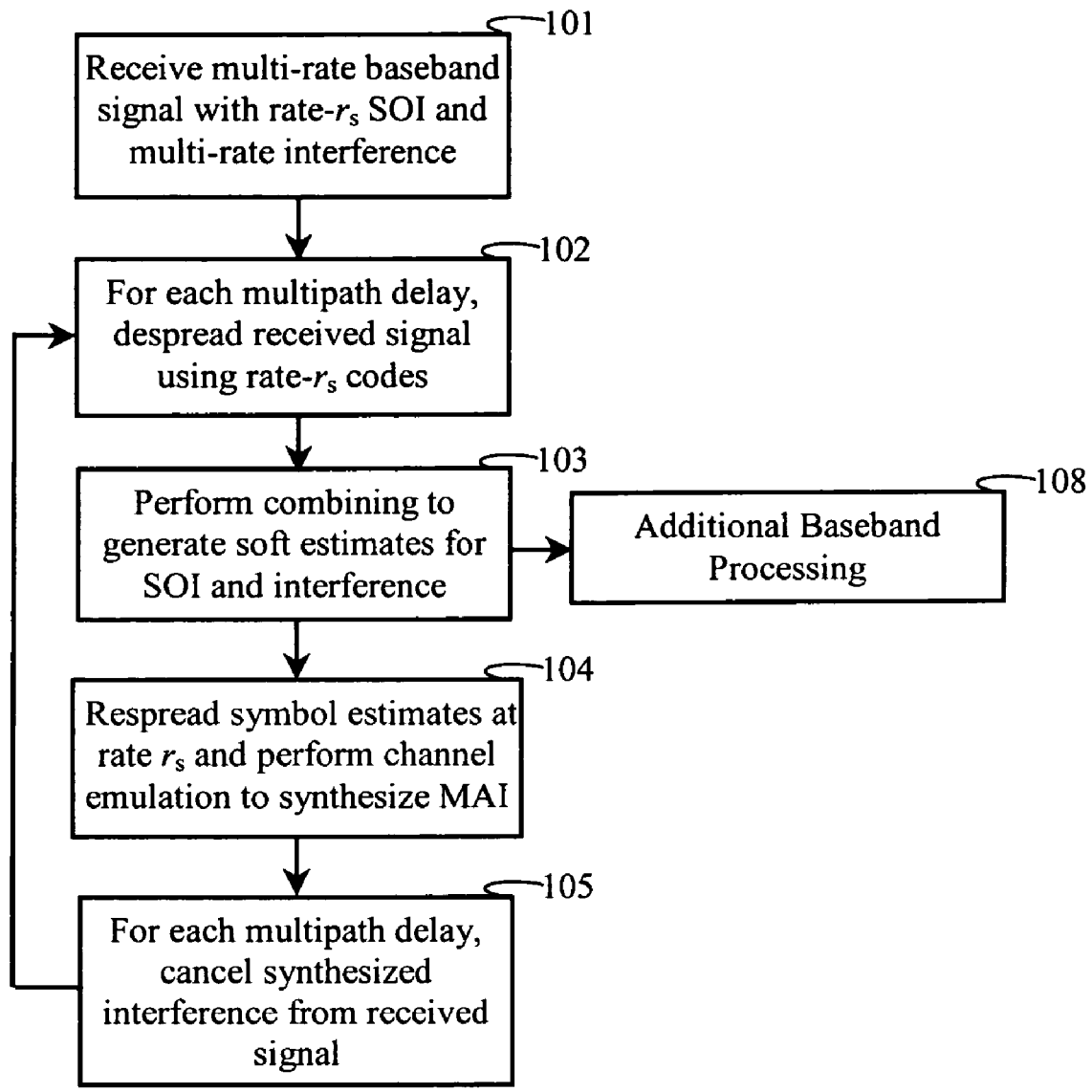
FIG. 1A is a block diagram illustrating a method for removing MAI due to high-rate and low-rate subchannels from an SOI in a low-rate subchannel.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In an OVSF code-tree structure, longer codes are generated from a shorter seed code (or kernel). For example, eight orthogonal Walsh/OVSF codes of length 128 may be generated from a root Walsh/OVSF code of length 16. The generating equation for the construction of eight OVSF codes $\{w_{128}^k, k=1, 2, \ldots, 8\}$ of length 128 from one root code $w_{16}$ of length 16 is $$[w_{128}^1 | w_{128}^2 | \ldots | w_{128}^8] = (I_8 \otimes w_{16}) E_8,$$

where $\otimes$ denotes a Kronecker product, $I_8$ is an 8-by-8 identity matrix, and the matrix $E_8 = [e^1, e^2, \ldots, e^8]$ is an 8-by-8 orthogonal Hadamard matrix of ones and minus ones. The matrix $(I_8 \otimes w_{16})$ contains the vector $w_{16}$ in elements 1 thru 16 of column 1, the vector $w_{16}$ in elements 17 thru 32 of the second column, and so on to the vector $w_{16}$ in elements 113 thru 128 of column 8. The fact that $E_8$ is orthogonal is easily established by noting that for the left-hand matrix to be orthogonal, as required by the construction, the right-hand side must be orthogonal. This requires $E_8^T E_8 = I_8$. The OVSF codes, $\{w_{128}^k, k=1, 2, \ldots, 8\}$, are referred to as the eight descendants of the ancestor $w_{16}$.

A temporal sequence of high-rate transmissions $a = [a[1], a[2], \ldots, a[8]]^T$ on the short Walsh code $w_{16}$ produces the 128-length vector $(I_8 \otimes w_{16})a$, which may be modeled as $$[w_{128}^1 | w_{128}^2 | \ldots | w_{128}^8] b = (I_8 \otimes w_{16}) a,$$

where $b = [b[1], b[2], \ldots, b[8]]$ is a spatial vector of low-rate surrogate symbols for the temporal vector of high-rate traffic symbols, a. Conversely, a could be a temporal vector of high-rate surrogate symbols for the spatial vector of low-rate traffic symbols b. Using the identity between the Walsh code vectors $w_{16}$ and the $w_{128}^k$, this equation may be written as $$(I_8 \otimes w_{16}) E_8 b = (I_8 \otimes w_{16}) a,$$

which means that $E_8 b = a$ or $b = E_8^T a$ is a solution.

A linear procedure to estimate the spatial vector of surrogate symbols b and their linear combination $[w_{128}^1 | w_{128}^2 | \ldots | w_{128}^8] b$ may also be a linear procedure for estimating the temporal vector of traffic symbols a and their linear combination $(I_8 \otimes w_{16})a$. Conversely a linear procedure to estimate the temporal vector of surrogate symbols a and their linear combination $(I_8 \otimes w_{16})a$ is a linear procedure for estimating the spatial vector of traffic symbols b and their linear combination $[w_{128}^1 | w_{128}^2 | \ldots | w_{128}^8]b$. These observations provide a basis for using a spatial estimation of the low-rate surrogate symbol vector b over eight long descendent codes to implement temporal estimation of the high-rate traffic symbol vector a over eight successive transmissions on a short ancestor code. Similarly, the temporal estimation of the high-rate surrogate vector a over eight successive short ancestor code transmission periods may be used to implement spatial estimation of the low-rate traffic symbol vector b over eight long descendent codes. Thus, in accordance with embodiments of the invention, temporal interference due to a traffic sequence of high-rate transmissions on short codes can be cancelled using a linear combination of low-rate spatial surrogates on long codes. Conversely, spatial interference effects due to a set of low-rate traffic transmissions on long codes can be cancelled using a linear combination of high-rate temporal surrogates on short codes.

In an interference-cancellation process, a received signal is analyzed to produce symbol estimates for each interfering subchannel, and these symbol estimates are used to synthesize estimates of the interference produced by the subchannels. For example, let two transmitted traffic symbols for a high-rate subchannel having a code length N be denoted by a=[a[1], a[2]]. After spreading, the interference signal is $(I_2 \otimes w_N)a$. Matched filtering (including down-sampling, PN/scrambling code removal (despreading), and channel gain compensation) is performed at a receiver to produce a length-2N received signal $$y=(I_2 \otimes w_N)a+n,$$

where n is zero-mean noise with covariance $\sigma^2 I$. If the analysis of this high-rate subchannel is performed at high rate using the code length N, the traffic symbol estimates are given by $$\hat{a}=(I_2 \otimes w_N)^*y=a+(I_2 \otimes w_N)^*n=a+w,$$

where the filtered noise term w has a covariance matrix $$R_{ww}=(I_2 \otimes w_N)^*\sigma^2 I(I_2 \otimes w_N)=\sigma^2 I.$$

If these symbol estimates are used to synthesize the interference at code length N, the synthesized interference is expressed by $$\hat{y}=(I_2 \otimes w_N)\hat{a}=(I_2 \otimes w_N)(I_2 \otimes w_N)^*y=P_{W_N}y,$$

where $P_{W_N}$ denotes the 2N-by-2N projection $P_{W_N}=(I_2 \otimes w_N)(I_2 \otimes w_N)^*$.

A high-rate channel may be analyzed using two descendant low-rate surrogate codes, such as corresponding surrogate codes of length 2N. Estimates for the surrogate symbols $b=[b[1], b[2]]^T$ are given by $$\hat{b}=V_{2N}^*y=V_{2N}^*((I_2 \otimes w_N)a+n)=E_2^T a+V_{2N}^*n=E_2^T a+E_2^T w=E_2^T \hat{a},$$

where $V_{2N}=[w_{2N}^1 | w_{2N}^2]$. The synthesized signal at length 2N is expressed by $\hat{z}=V_{2N}\hat{b}=V_{2N}V_{2N}^*y=P_{V_{2N}}y$, where $P_{V_{2N}}$ is the 2N-by-2N projection, $P_{V_{2N}}=V_{2N}V_{2N}^*$. However, the projections $P_{V_{2N}}$ and $P_{W_N}$ are equal:

$$P_{V_{2N}}=V_{2N}V_{2N}^*=W_N E_2 E_2^T W_N^*=W_N W_N^*=P_{W_N}.$$

Therefore, $\hat{z}=\hat{y}$, which shows that analysis and synthesis of a high-rate subchannel at the low-rate of its descendants is equivalent to analysis and synthesis of the high-rate subchannel at the high rate of the ancestor.

It can also be shown that the estimators of a and b have related second-order statistics. The symbol estimates $\hat{a}$ and $\hat{b}$ are related by $E_2\hat{b}=\hat{a}$ or $\hat{b}=E_s^T\hat{a}$ such that $E\{\hat{b}\hat{b}^*\}=E_2^T E\{\hat{a}\hat{a}^*\}E_2$, where the unsubscripted E denotes expectation. If the traffic channel of interest is the ancestor channel of length N, then $$E\{\hat{a}\hat{a}^*\}=E\{aa^*\}+\sigma^2 I_2=\mathrm{diag}[A^2,A^2]+\sigma^2 I_2 \text{ and}$$

$$E\{\hat{b}\hat{b}^*\}=E_2^T E\{\hat{a}\hat{a}^*\}E_2=\mathrm{diag}[A^2,A^2]+\sigma^2 I_2,$$

by virtue of the orthogonality of $E_2$, where A is the transmission amplitude on the high rate traffic subchannel. Thus, within the precision of statistical averaging, estimates of the diagonal elements of $E\{\hat{b}\hat{b}^*\}$ are equal to estimates of the diagonal elements of $E\{\hat{a}\hat{a}^*\}$. The two diagonal elements of $E\{\hat{a}\hat{a}^*\}$ are equal, so the diagonal elements of the estimates for $E\{\hat{b}\hat{b}^*\}$ may, but need not, be averaged to estimate $E\{\hat{a}\hat{a}^*\}$.

If the traffic channels are the descendant channels of length 2N, then $$E\{\hat{b}\hat{b}^*\} = \mathrm{diag}[B^2[1], B^2[2]]+\sigma^2 I_2 \text{ and } E\{\hat{a}\hat{a}^*\}$$
$$= E_2 \mathrm{diag}[B^2[1], B^2[2]]E_2^T+\sigma^2 I_2$$
$$= \frac{[B^2[1]+B^2[2]]}{2}I_2,$$

where B[i] is the transmission amplitude on the $i^{th}$ low-rate descendant. In this case, estimators for $E\{\hat{a}\hat{a}\}$ do not equal estimators of $E\{\hat{b}\hat{b}^*\}$, unless the channel powers for the two low rate channels are equal. Nonetheless, the estimators of power from the high rate channel may be used to approximate average power of the low rate channels.

Embodiments of the invention may be generalized to include any set of high and low rates given by $(N, 2^p N)$, where p is a positive integer. Furthermore, synthesis may comprise an additional step of weighting the subchannel estimates. For example, if $\Gamma_N=E\{\hat{a}\hat{a}^*\}$ represents a 2-by-2 diagonal weighting matrix applied to $\hat{a}$, and $\Gamma_{2N}=E\{\hat{b}\hat{b}^*\}$ is a 2-by-2 diagonal weighting matrix applied to $\hat{b}$, the projections used in the synthesis are replaced by non-orthogonal symmetric matrices $$\hat{z}=V_{2N}\Gamma_{2N}\hat{b}=V_{2N}\Gamma_{2N}V_{2N}^*y \text{ and}$$

$$\hat{y}(I_2 \otimes w_N)\Gamma_N\hat{a}=(I_2 \otimes w_N)\Gamma_N(I_2 \otimes w_N)^*y.$$

In this case, $\hat{z}=\hat{y}$ if and only if $\Gamma_N=\Gamma_{2N}$. If the traffic channel is the high-rate ancestor channel of length N, then the diagonal elements of $\Gamma_N$ and $\Gamma_{2N}$ will be identical, as argued above. Moreover, the estimator of $\Gamma_{2N}$ may, but need not, be averaged on its diagonals to estimate the constant diagonals of $\Gamma_N$. Conversely, if the traffic channels are one or more of the low-rate descendant channels of length 2N, then diagonal elements of $\Gamma_N$ and $\Gamma_{2N}$ will be different, as argued above. Nonetheless, an estimate of $\Gamma_N$ may be used to approximate an estimate of $\Gamma_{2N}$. In applications of the invention, estimators of $\Gamma_{2N}$ and $\Gamma_N$ may be used interchangeably. All of these arguments apply to exact $\Gamma$, estimates of $\Gamma$, or functions of these estimates, including but not limited to estimators of SINR, estimators of functions of SINR (e.g. SINR/(SINR+1)) rather than estimates of power for the diagonal values of the $\Gamma$. In some implementations, $E_2$ may not be orthonormal ($E_2$ will still be orthogonal). In such cases, the estimators of $\Gamma_{2N}$ and $\Gamma_N$ may additionally provide a scale factor relative to each other to account for the gain introduced by the transformation (e.g. $b=E_2^T a$).

Embodiments of the invention may be configured to provide for soft decisions when processing a multi-rate signal at the lowest possible rate or at a chosen intermediate rate of processing R. In one embodiment of the invention, the rate of processing R may be chosen such that the rates of most subchannels are equal to or greater than R. Some embodiments of the invention may be configured to switch between performing soft decisions when processing a multi-rate signal at the lowest possible rate and performing hard decisions for signals processed at multiple rates.

FIG. 1A is a block diagram illustrating a method for removing interference due to subchannels of various rates. A multi-rate transmission comprises a plurality of orthogonal code-multiplexed subchannels having a plurality of transmission rates. For example, WCDMA systems may include high-rate HSDPA data channels and low-rate AMR 12.2 Kbps voice channels. However, orthogonality between the subchannels is typically destroyed due to propagation in a multipath channel.

A received transmission is processed 101 to produce a digital baseband signal with a subchannel communicating at rate $r_s$ and MAI from subchannels communicating at higher and lower rates unequal to $r_s$. Such processing 101 may include down-converting the received signal from RF to baseband, followed by analog-to-digital conversion. For each multipath delay, the received signal is despread 102 using at least one code of rate $R = r_s$ to produce a plurality of despread signals. Despreading 102 may include a Fast Hadamard transform corresponding to the rate $r_s$. Despread signals produced from similar despreading codes, but corresponding to different multipaths, are combined and processed 103 to produce symbol estimates for actual and surrogate subchannels at rate $r_s$. Combining 103 may include Maximal Ratio Combining, Equal Gain Combining and Selection Combining. The resultant estimates are typically soft estimates.

A synthesis step 104 is performed on the soft estimates to generate an estimated interference signal (i.e., synthesized MAI) corresponding to each multipath delay for every source of interference. Each MAI symbol estimate may be weighted relative to some function of the SINR of its corresponding subchannel, followed by respreading, transmit-receiver filter effect emulation, and channel emulation. As shown previously, the SINR of a high-rate channel is the same as the SINR of its corresponding lower-rate descendants. For example, an HSDPA subchannel with a spreading factor of 16 has the same SINR as its eight corresponding descendants with spreading factor 128. Thus, a weight that depends on SINR (e.g., a weight having the form SINR/(SINR+1)) is the same for a high-rate subchannel and its low-rate descendants, assuming that power control and Doppler frequency variations occur more slowly than the low rate.

An interference-cancellation step 105 provides for removing the estimated interference signal from the received baseband signal for each multipath delay to produce an interference-cancelled signal, which may be fed back to the despreading step 102. The despreading step 102 is additionally configured to despread the interference-cancelled signal and perform soft decisions for the MAI. A predetermined number of iterations may be performed or some iteration criterion may be used to determine whether to continue iterative processing. Upon termination of the iterative process, a soft estimate for the SOI is produced 108 for further downstream processing, including rate matching, de-interleaving, and decoding (not shown).

Figure 1B:
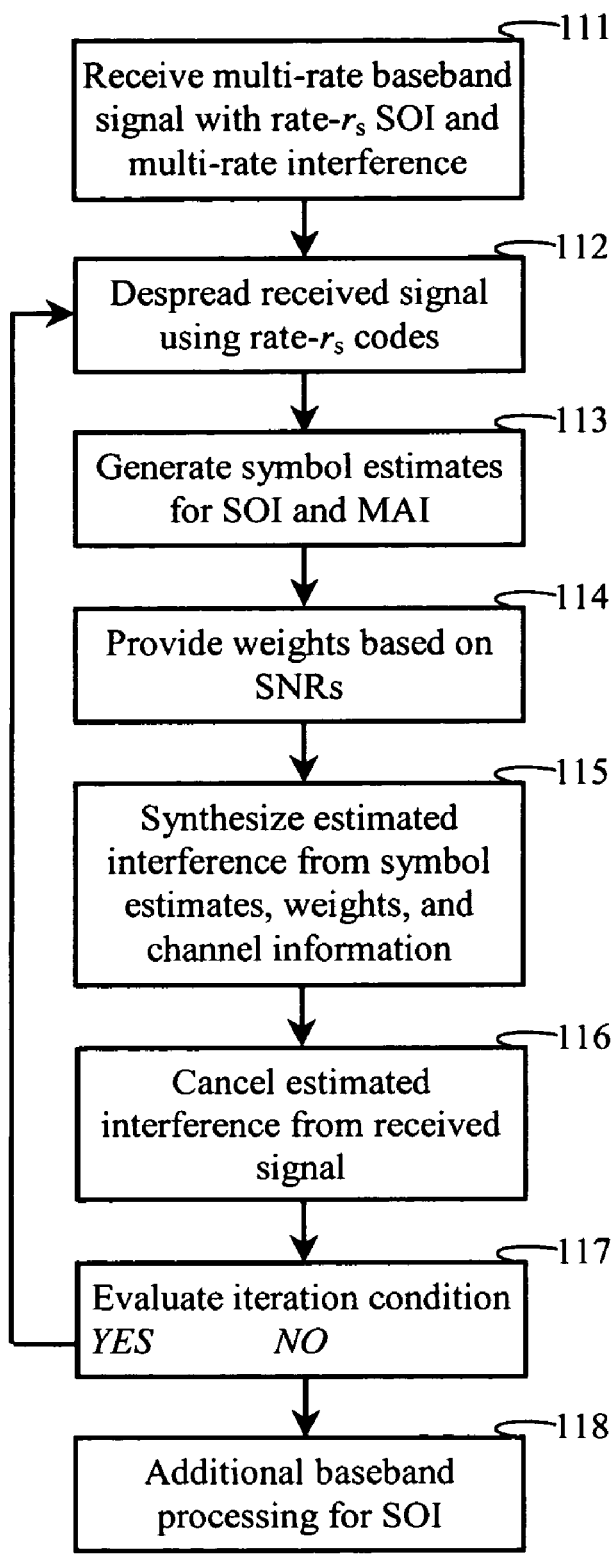
FIG. 1B is a block diagram illustrating an alternative method for removing MAI due to high-rate and low-rate subchannels from an SOI in a low-rate subchannel.

FIG. 1B is a block diagram illustrating an alternative method for removing interference due to multi-rate subchannels, at rate R. A received multi-rate transmission is processed 111 to produce a baseband signal comprising an SOI and multi-rate interference. The received baseband signal is despread 112 using codes at rate R, followed by soft-decision processing 113 for generating soft estimates for subchannels at the length specified by rate R. Each symbol estimate may be provided with a weight 114 that is a function of the SINR of its corresponding subchannel. A synthesis step 115 produces an estimated interference signal from the MAI symbol estimates, corresponding symbol weights, and channel information. An interference-cancellation step 116 cancels the estimated interference signal from the received baseband signal to produce an interference-cancelled signal. Interference cancellation may include removing the interfering signal using projection, weighted projection, subtraction, or weighted subtraction. An iteration decision is made 117, followed by processing the interference-cancelled signal in step 112 or producing an output symbol estimate 118 for the SOI. Otherwise, the symbol decision 118 is typically a soft estimate used for further baseband processing.

Those skilled in the art should recognize that method and apparatus embodiments described herein may be implemented in a variety of ways, including implementations in hardware, software, firmware, or various combinations thereof. Examples of such hardware may include Application Specific Integrated Circuits (ASICs), Field Programmable Gate Arrays (FPGAs), general-purpose processors, Digital Signal Processors (DSPs), and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium such as a SIM card, a USB memory interface, or other computer-readable memory adapted for interfacing with a consumer wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

Figure 1C:
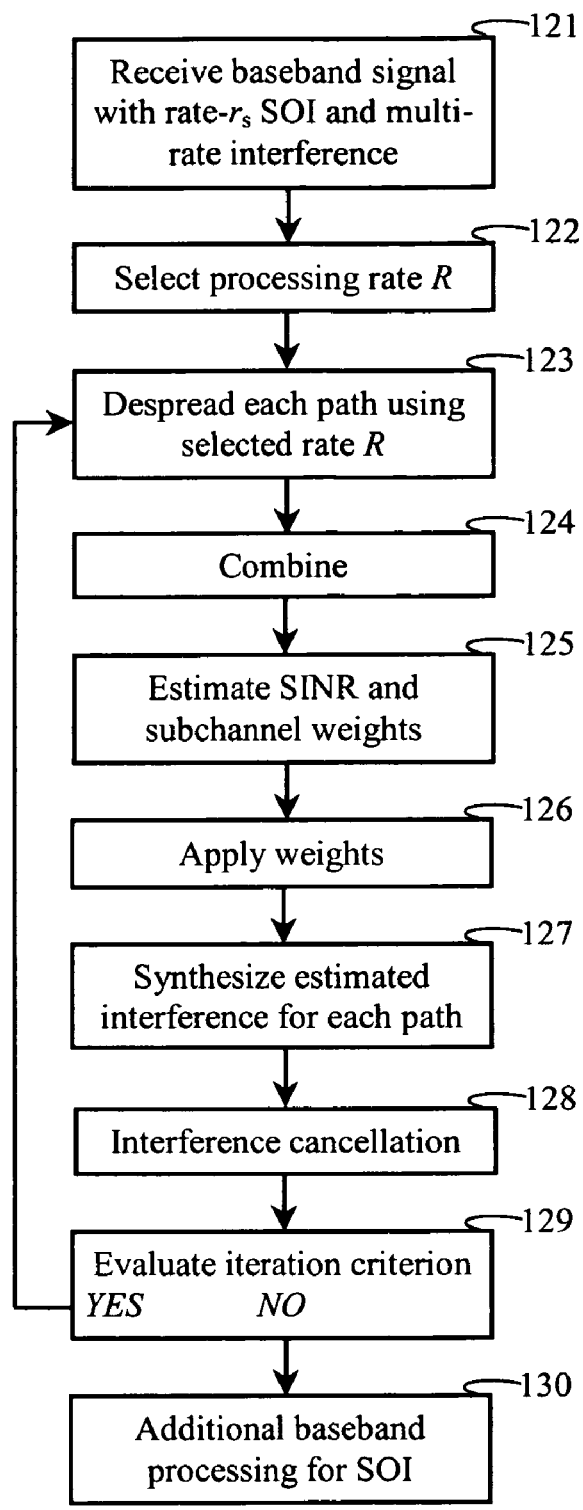
FIG. 1C is a block diagram illustrating a method for removing multi-rate interference from an SOI.

FIG. 1C is a block diagram of an exemplary method for removing multi-rate interference. A received multi-rate transmission is processed 121 to produce a baseband signal with SOI and multi-rate interference. Rate-selection block 122 selects a processing rate R for processing the baseband signal in an interference-cancellation stage configured to perform analysis and synthesis.

Embodiments of the invention may be configured to select rate R to be equal to, or lower than, the rates of most of the subchannels. Interfering subchannels having rates equal to or higher than the processing rate R will not experience a loss in SINR. Since processed subchannels having a rate lower than the processing rate R may experience a loss in SINR, it may be desirable to select the lowest possible processing rate. In some embodiments, a trade-off between complexity and performance may dictate the choice of processing rate. Furthermore, the choice of R may be based on system configuration and/or characteristics of the communication channel. In a WCDMA system in which HSDPA channels have a code length 16 and AMR 12.2 channels have a code length 128, the processing rate R may be selected to correspond to a code length 128 even though common channels (such as C-PICH, P-CCPCH, and PICH channels) have a code length 256.

The received baseband signal is despread 123 using codes at the processing rate R. Despread signals produced from similar despreading codes, but corresponding to different multipaths, are combined and processed 124 to produce symbol estimates at rate R. Combining methods may include Maximal Ratio Combining, Equal Gain Combining, and Selection Combining. It is anticipated that other combining methods known in the art that involve equalization of the received signal such as a Minimum Mean Squared Error Combiner or a Minimum Variance Unbiased Combiner may be used as well. SINR estimation and weight computation 125 is performed for each subchannel. The weights may be generated using a predetermined function of the quality of each subchannel.

In an exemplary embodiment, the weight computed 125 for each subchannel (which may be given by SNR/(SNR+1), where SNR is the SINR of the corresponding subchannel) is used to weight the symbol estimates. The weighted estimates are used to synthesize 127 interference that is cancelled from the SOI. The synthesis step 127 may comprise spreading, scrambling, channel emulation, and transmit-receive filter emulation. Interference cancellation 128 may include removing the interfering signal using projection, weighted projection, subtraction, or weighted subtraction. The resulting interference-cancelled signal is coupled to an iteration controller 129 that controls the number of iterations in an iterative cancellation process. Upon the final iteration, the interference-cancelled signal may be coupled to a system configured to perform additional baseband processing, such as a matched-filter receiver that is matched to the SOI's code and rate $r_s$.

Figure 2A:
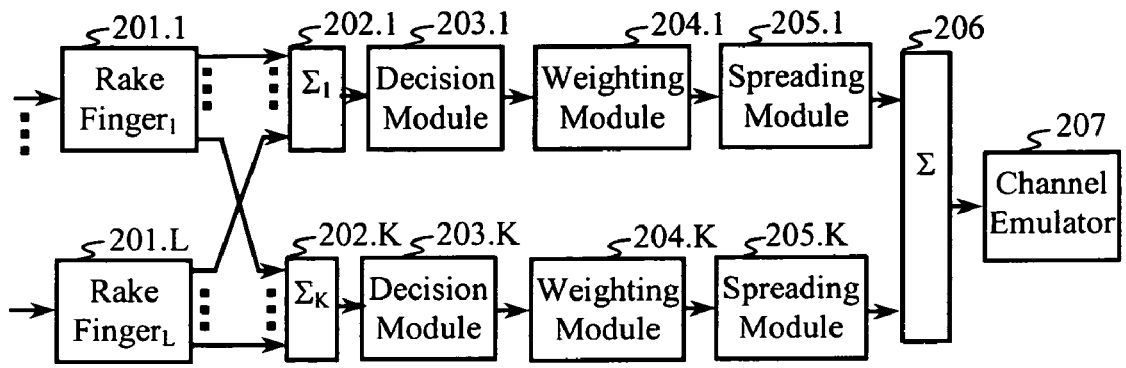
FIG. 2A is a block diagram of a CDMA receiver embodiment of the invention configured to process a received multi-rate code-multiplexed signal.

FIG. 2A is a block diagram of a CDMA receiver embodiment of the invention configured to process a received digital baseband signal comprising K code-multiplexed subchannels and L multipath components per subchannel for a given source (e.g., a base station). The output $\hat{s}_i^j$ of a particular Rake finger represents an $i^{th}$ multipath of a $j^{th}$ source. Front-end receiver components, such as an antenna, a down-converter, and an analog-to-digital converter (which are not shown), are typically used to convert a received radio-frequency signal to a digital baseband signal.

A generalized Rake receiver for a given source j includes a plurality L of generalized Rake fingers 201.1-201.L with each finger assigned to a particular multipath component by a searcher/tracker module (not shown). As is well known in the art, the generalized Rake receiver may comprise a plurality of correlators configured with time offsets for despreading each code-multiplexed subchannel with respect to the L multipath components. Each Rake finger 201.1-201.L despreads each of the K code-multiplexed subchannels to produce K despread signals.

In one embodiment of the invention, the receiver is configured to employ low-rate despreading to process high-rate (low spreading factor) subchannels that introduce MAI to an SOI. The despread signals from different multipaths are combined with respect to each subchannel in K combiners 202.1-202.K. Combining may include weighting each despread signal with the SINR (or a function of the SINR) of its corresponding multipath. The combiners 202.1-202.K may include, by way of example, an MRC combiner, an Equal Gain Combiner, a Minimum Mean Squared Error Combiner, a Minimum Variance Unbiased Combiner, or a Selection Combiner. In some embodiments, alternative combining techniques may be used.

At least one decision module, such as decision modules 203.1-203.K, produces symbol estimates for each subchannel. In one embodiment of the invention, hard or soft symbol estimates may be produced for both the signal of interest and for interfering subchannels.

Soft symbol estimates may be weighted with a weight by weighting modules 204.1-204.K. In another embodiment, the weights are computed as a function of the subchannel SINR. The weighting modules 204.1-204.K, spreading modules 205.1-205.K, combiner 206, and channel emulator 207 function as components of an interference-synthesis unit that generates an estimated interference signal $\hat{s}_i^j$ corresponding to MAI for the signal of interest from the $i^{th}$ path of the $j^{th}$ source. In some embodiments, the spreading modules 205.1-205.K and combiner 206 may be implemented as a Fast Hadamard Transform block followed by a PN scrambler. The channel emulator 207 may further provide for the effects of transmitter and receiver filters.

Figure 2B:
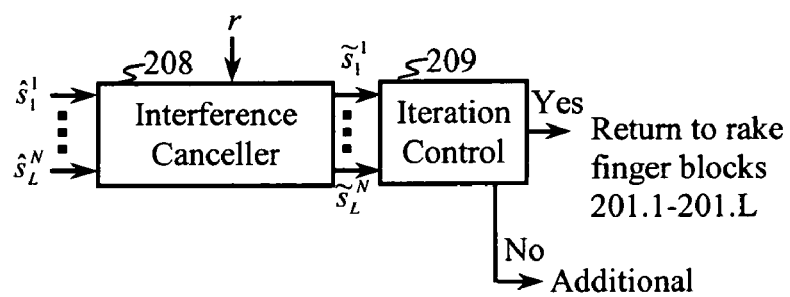
FIG. 2B is a block-diagram of an interference canceller configured to process a received multi-rate code-multiplexed signal.

FIG. 2B illustrates an interference canceller in accordance with one embodiment of the invention. A received baseband signal and at least one estimated interference signal $\hat{s}_i^j$ are input to an interference-cancellation block 208 to produce at least one interference-cancelled signal $\tilde{s}_i^j$ corresponding to an $i^{th}$ path of a $j^{th}$ source. The estimated interference signal is $\hat{s}_i^j$, $1 \leq i \leq L$, $1 \leq j \leq N$, where N is the number of sources and L is the number of paths in each source. However, the value of L may not be the same for each source. The at least one interference-cancelled signal $\tilde{s}_i^j$ is coupled to an iteration-control block 209, which is configured to evaluate the need for another iteration based on at least one predetermined criterion. If the evaluation criterion succeeds, the at least one interference-cancelled signal $\tilde{s}_i^j$ is coupled to generalized rake finger blocks 201.1-201.L for each source to perform a subsequent interference cancellation iteration. If the evaluation criterion fails, at least one interference-cancelled signal $\tilde{s}_i^j$ is coupled out of the interference-cancellation loop for additional baseband processing (not shown).

Figure 2C:
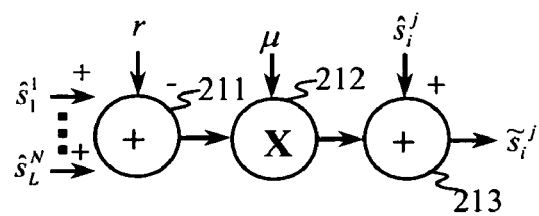
FIG. 2C is a diagram illustrating one embodiment of the interference canceller configured to remove MAI from a CDMA system.

FIG. 2C illustrates an interference cancellation method configured to produce an interference cancelled signal $\tilde{s}_i^j$ for the $i^{th}$ path of the $j^{th}$ source. The estimated interference signals $\hat{s}_i^j$ are subtracted 211 from the received baseband signal r to produce an interference-cancelled signal that is scaled 212 by a step size μ. The step-size μ may be a constant, or it may be updated for each iteration for each symbol-transmission period. The scaled interference-cancelled signal is added 213 to the estimated interference signals $\hat{s}_i^j$ to produce the interference cancelled signal $\tilde{s}_i^j$, which may be used in a subsequent iteration of a cancellation process or it may be subject to additional baseband processing.

Figure 3A:
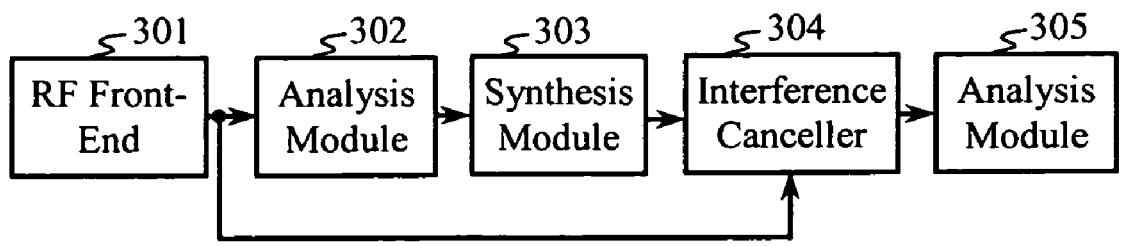
FIG. 3A illustrates a receiver embodiment configured to cancel MAI in a multi-rate code-multiplexed signal.

FIG. 3A illustrates a receiver embodiment configured to cancel MAI in a signal characterized by a plurality of multi-rate orthogonal code-multiplexed subchannels. An RF front-end 301 couples a transmitted signal from a communication channel, down-converts the signal to baseband, and performs analog-to-digital conversion to produce a received baseband signal. In an exemplary embodiment, the received baseband signal comprises a subchannel containing an SOI and at least one high-rate subchannel that contributes MAI.

An analysis module 302 is configured to analyze the at least one high-rate subchannel at a selected low rate R to produce at least one soft-decision MAI estimate for each low-rate symbol interval. For example, the analysis module 302 may employ low-rate, high-spreading-factor descendent codes to despread high-rate ancestor subchannels that contribute MAI to the SOI. In some embodiments of the invention, the analysis module 302 may employ a Hadamard transform. The analysis module 302 may further include a soft-decision processor to produce soft symbol estimates for the MAI and SOI.

The terms "low-rate signals" and "low-rate symbols" pertain to any multi-rate communication system in which data symbols may be transmitted in a subchannel whose rate is low with respect to at least one subchannel having a higher rate (i.e., at least one high-rate subchannel used to transmit high-rate symbols). In embodiments of the present invention, the interference effects of high-rate channels may be calculated from at least one low-rate descendant of a high-rate signal in a received signal, and these effects may be cancelled at the low rate.

Systems employing variable spreading codes are one example of a multi-rate communication system. For example, in a multi-rate CDMA system, a low-rate subchannel may employ at least one orthogonalizing code having a higher spreading factor than an orthogonalizing code employed in a high-rate subchannel. Furthermore, embodiments of the invention may be configured to operate in other multi-rate communication systems that support varied data rates derived from tree structures similar to the Walsh-code tree. Exemplary systems include, by way of example, but without limitation, other types of CDMA systems employing multiple spreading factors.

A synthesis module 303 is configured to synthesize an estimated interference signal from the MAI soft estimates. In an exemplary embodiment, weights may be produced for each symbol estimate, and each weight may be a function of SINR for the symbol estimate's corresponding subchannel. Because each MAI symbol estimate generated by the analysis module 302 corresponds to a despreading code having a selected rate R, the synthesis module 303 is configured to use corresponding spreading codes to respread the symbol estimates. The set of respread symbol estimates constitutes an estimated transmit signal, which is provided with channel emulation (which typically includes transmitter and receiver filter emulation) to produce an estimated interference signal (i.e., synthesized MAI). Channel emulation may include delaying the estimated transmit signal according to a plurality of measured multipath delays and scaling each delayed transmit signal with a corresponding complex channel gain.

An interference canceller 304 is configured to process the estimated interference signal with the received baseband signal for producing an interference-cancelled signal. In one embodiment, the estimated interference signal for any given multipath is simply subtracted from the received baseband signal. In another embodiment, the interference canceller 304 may project out interference in the received baseband signal. The interference canceller 304 may be followed by an analysis module 305 configured to despread the interference-cancelled signal and produce a decision of the SOI therefrom, which may be processed via additional baseband processing (not shown).

Although the synthesis module 303 and the interference canceller 304 are shown as separate modules, the synthesis module 303 may be incorporated within the interference canceller 304, in which case, the interference canceller 304 may perform the synthesis function.

Figure 3B:
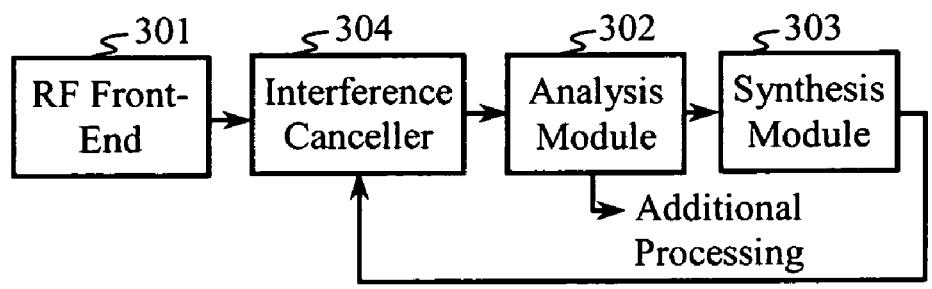
FIG. 3B illustrates an alternative receiver embodiment configured to cancel MAI in a multi-rate code-multiplexed signal.

FIG. 3B illustrates an alternative receiver embodiment in which the interference canceller 304 is coupled between the RF front-end 301 and the analysis module 302. During a first iteration, the received baseband signal passes through the interference canceller 304 to the analysis module 302. An estimated interference signal produced by the synthesis module 303 is coupled to the interference canceller 304, which generates the interference-cancelled signal from the estimated interference signal and the received baseband signal. Upon each subsequent iteration, the analysis module 302 processes the latest interference-cancelled signal produced by the interference canceller 304. The analysis module 302 may produce soft symbol estimates for the MAI for each iteration. In the final iteration, SOI symbol estimates are coupled out of the iterative feedback loop for additional baseband processing.

In one embodiment of the invention, an interference cancellation system residing in a receiver includes an analysis means configured to employ at least one low-rate despreading code (i.e., a despreading code having a high spreading factor) for processing a received baseband signal to produce at least one despread received signal. In one embodiment, the received baseband signal includes high-rate (low spreading factor) subchannels that introduce MAI to an SOI encoded with a low-rate spreading code.

The analysis means may include, by way of example, but without limitation, a plurality of correlators (e.g., despreaders in a Rake receiver) configured with time offsets for despreading each code-multiplexed subchannel. The analysis means may include a combining means configured to combine the despread signals from the L different multipaths with respect to each of K subchannels. The combining means may be a weighted combining means that includes a weighting means for weighting each despread signal with the SINR (or a function of the SINR) of its corresponding multipath. The analysis means may include a decision means configured to produce soft estimates for the MAI subchannels. In the final iteration, the decision means may be configured to produce soft decisions for the SOI. The SOI decisions coupled out of the iterative canceller may be processed by an additional baseband processing means (not shown).

An interference-synthesis means is configured to process decisions made by the decision means to reconstruct the MAI. Using the initial decisions for all users and the corresponding spread-spectrum codes, the interference-synthesis means first performs a function analogous to that of a transmitter to generate an estimated transmission that is a superposition of the data signals for all users. This signal typically comprises a linear combination of corresponding spread-spectrum modulated symbol estimates. Since the estimated transmitted signals have the same time reference, the effects of the channel need to be impressed on the estimated transmitted signals in order to produce an estimated interference signal. Once the multipath signals corresponding to each source are reconstructed, they are combined to produce an estimate of the received baseband signal corresponding to the SOI and MAI.

The synthesis means may include, by way of example, but without limitation, a weighting module, a spreading module, a transmitter and receiver filter emulator, and a channel emulator. The weighting module may apply a weight to each symbol estimate prior to spreading by the spreading module. The resulting estimated transmitted signal for each user is delayed by a time period corresponding to each corresponding multipath and multiplied with a complex gain corresponding to that multipath. The delay and gain for each multipath are typically obtained from the receiver's searcher/tracker.

In one embodiment, an interference-cancellation means is configured to subtract at least one estimated interference signal from the received baseband signal to produce an interference-cancelled signal. In one embodiment, an interference-cancellation means is configured to subtract the estimate of the received baseband signal from the received baseband signal, scaled by an optimal step-size, followed by a decision module (or symbol estimator) that resolves the resulting signal into symbol estimates, and adds these symbol errors to the previous symbol estimate. Thus, embodiments of the invention may be configured to perform sample-level or chip-level interference cancellation. The analysis means may provide for a low-rate despreading of the interference-cancelled signal and producing hard and/or soft decisions for at least one subchannel. The interference-cancellation means may include, by way of example, but without limitation, a subtractive canceller, a weighted subtractive canceller, a projective canceller, a weighted projective canceller, or some combination thereof.

In an alternative embodiment, the interference-cancellation means is configured to despread the estimated interference signal relative to a time instant for each identified multipath to produce a plurality of despread estimated interference signals. Each despread estimated interference signal is removed from the despread signal for the corresponding multipath. Because the despread estimated interference signal includes the multipath component for the corresponding path, the estimated despread signal for that path may be added after the despread estimated interference signal is removed. Subsequently, new decisions are made and the previous process may be iterated several times.

Embodiments of the invention may be configured to operate with Parallel IC (PIC) and Serial IC (SIC). In a PIC system, all users are simultaneously demodulated, a tentative decision is made for their information symbols, the MAI is regenerated, and the process is repeated a predetermined number of times or until a predetermined performance criterion is achieved. With SIC, a similar process is performed, except that a decision on the strongest user (i.e., subchannel) is made first, the interference from that user on the decision statistic of the next strongest user is subsequently removed and a decision for the next stronger user is made. This process is repeated for all users.

Figure 4A:
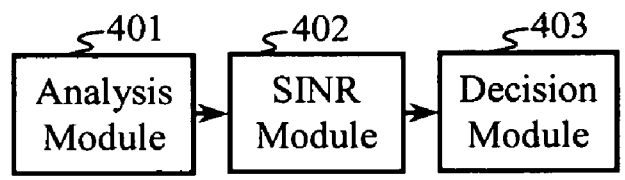
FIG. 4A is a functional block diagram of a signal processing system configured for determining the presence or absence of high-rate and low-rate subchannels.

FIG. 4A is a functional block diagram of a signal processing system configured for determining the presence or absence of high-rate and/or low-rate subchannels. An analysis module 401 is configured for performing at least one of a high-rate analysis and a low-rate analysis on a received baseband signal. An SINR module 402 is configured for calculating a signal-to-interference-and-noise ratio (SINR) for each subchannel processed by the analysis module 401. A decision module 403 is configured for employing a function of the SINR to determine the presence or absence of high-rate and low-rate subchannels in the received baseband signal.

In one embodiment of the invention, a function of the SINR corresponding to at least one of a high-rate analysis and a low-rate analysis may be used to determine the presence or absence of high-rate and low-rate subchannels. For example, if an HSDPA subchannel of codelength 16 is a traffic channel, then the variance of the SINR as measured in its eight descendants at codelength 128 (lower rate) is zero. That is, the SINR of the eight descendants of the HSDPA channel are the same and equal to the SINR of the HSDPA channel itself. On the other hand, eight traffic subchannels of codelength 128 having a common ancestor of length 16 will not exhibit this property. The SINR of the eight low-rate subchannels will be different from each other, as their transmit amplitudes will typically be different. Also, the SINR of their length-16 ancestor will be an average of the component SINRs. This difference in the SINR behavior of high-rate and low-rate channels when analyzed at the low rate may be used to identify the presence of channels of various rates. This in turn may be used to perform both analysis and synthesis at various rates for interference cancellation. That is, the high-rate subchannels may be analyzed/synthesized at the high rate, and the low-rate subchannels may be analyzed/synthesized at the low rate. This provides for additional performance advantages by allowing for hard and soft decisions to be made on each of the subchannels.

Figure 4B:
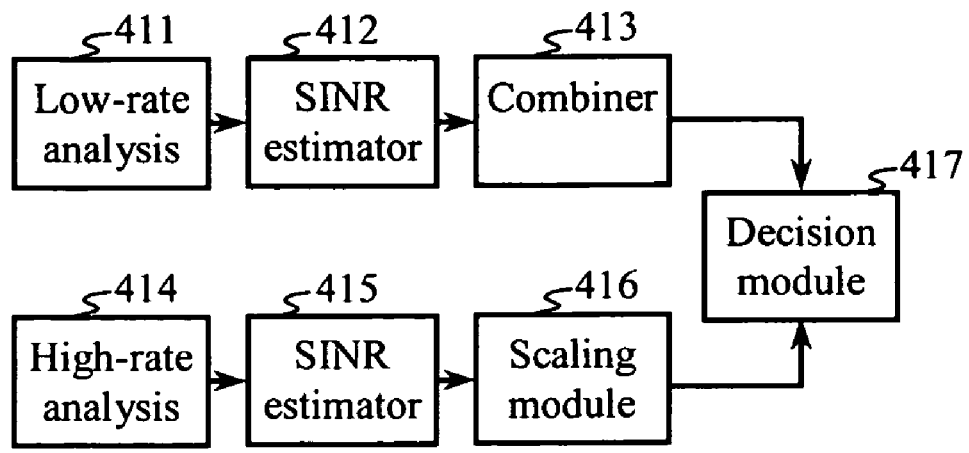
FIG. 4B illustrates an apparatus for identifying low-rate and high-rate subchannels in accordance with one embodiment of the invention

FIG. 4B illustrates an apparatus configured for identifying low-rate subchannels and high-rate subchannels in accordance with an embodiment of the invention. The received baseband signal is passed through a low-rate analysis block 411 that produces soft estimates for low-rate descendants of a high-rate subchannel. For example, when processing WCDMA/HSDPA signals, the low-rate analysis block 411 outputs symbol estimates of eight subchannels corresponding to codelength 128 that are descendants of a 16-length ancestor subchannel. SINR estimator 412 outputs SINRs of symbol estimates, which are summed by a combiner 413 and coupled to a decision module 417.

The received baseband signal is also processed by a high-rate analysis block 414 that produces symbol estimates at the high rate. The symbol estimates are coupled to SINR module 415, which computes SINRs for the high-rate subchannel of interest. A scaling module 416 multiplies the SINRs by a ratio of the high rate and the low rate. For example, the multiplication factor corresponding to codelengths 128 and 16 is 128/16=8. A decision module 417 determines which of the ancestor (high-rate subchannel) or the descendants (low-rate subchannels) are present. If the difference in inputs to the decision module 417 is within a predetermined range, the ancestor is determined to be present. If the difference is greater than a predetermined value, it is more probable that the descendants are present.

Figure 4C:
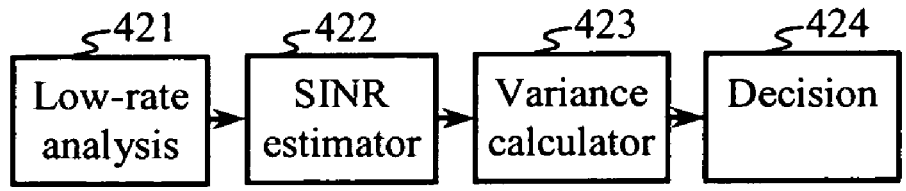
FIG. 4C illustrates a method and apparatus for identifying low-rate and high-rate subchannels in accordance with an alternative embodiment of the invention.

FIG. 4C illustrates an alternate method and apparatus for identifying low-rate and high-rate subchannels in accordance with an embodiment of the invention. The received baseband signal is passed through a low-rate analysis block 421 that produces soft estimates for the low-rate descendants of a high-rate subchannel. An SINR estimator 422 outputs SINRs of the soft estimates. The SINRs are processed by a variance calculator 423 that produces a coarse variance estimate for the SINRs. A decision module 424 determines which of the ancestor (high-rate subchannels) or descendants (low-rate subchannels) are present. If the variance is within a predetermined range, then a high-rate ancestor is determined to be present. If the variance is above a predetermined value, the low-rate descendant subchannels are determined to be present.

Figure 4D:
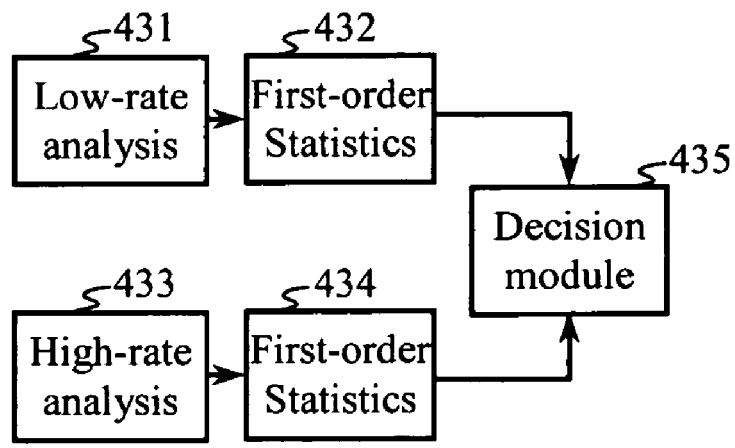
FIG. 4D illustrates a method and apparatus for identifying low-rate and high-rate subchannels in accordance with yet another embodiment of the invention.

FIG. 4D illustrates an alternate method for identifying low-rate channels and high-rate channels in accordance with one embodiment of the invention. A received baseband signal is passed through a low-rate analysis block 431, which outputs a vector of low-rate symbol estimates. In the case of WCDMA/HSDPA, the symbol estimates correspond to the eight subchannels at codelength 128 that are descendants of a common ancestor having a codelength of 16. A first-order statistics block 432 processes the symbol estimates to calculate mean and/or variance. The first-order statistics (and optionally, instantaneous symbol estimates) are coupled to a decision module 435.

The received baseband signal is also passed through a high-rate analysis block 433, which outputs a vector of high-rate symbol estimates at the low rate. In WCDMA/HSDPA systems, the symbol estimates for codelength 16 are stacked and output as a vector of eight symbol estimates to a first-order statistics block 434. Block 434 calculates first-order statistics of the vector of high-rate symbol estimates. The first-order statistics may include mean and variance. Block 434 may additionally produce an average of the vector of high-rate symbol estimates. The output of block 434 is passed on to decision module 435, which makes a decision on which of the ancestor (high-rate subchannel) or the descendants (low-rate subchannels) are present. The decision module 435 may use one or more first-order statistics along with other outputs of blocks 432 and 434 based on at least one predetermined criterion to estimate the rate of subchannels of interest.

In an exemplary embodiment, the decision module 435 may determine that subchannels under consideration are low-rate subchannels if the instantaneous symbol estimates from block 433 have a magnitude above a predetermined value. The decision module 435 may determine the presence of high-rate subchannels if the magnitudes of instantaneous symbol estimates from block 431 are all below a predetermined value.

Figure 5A:
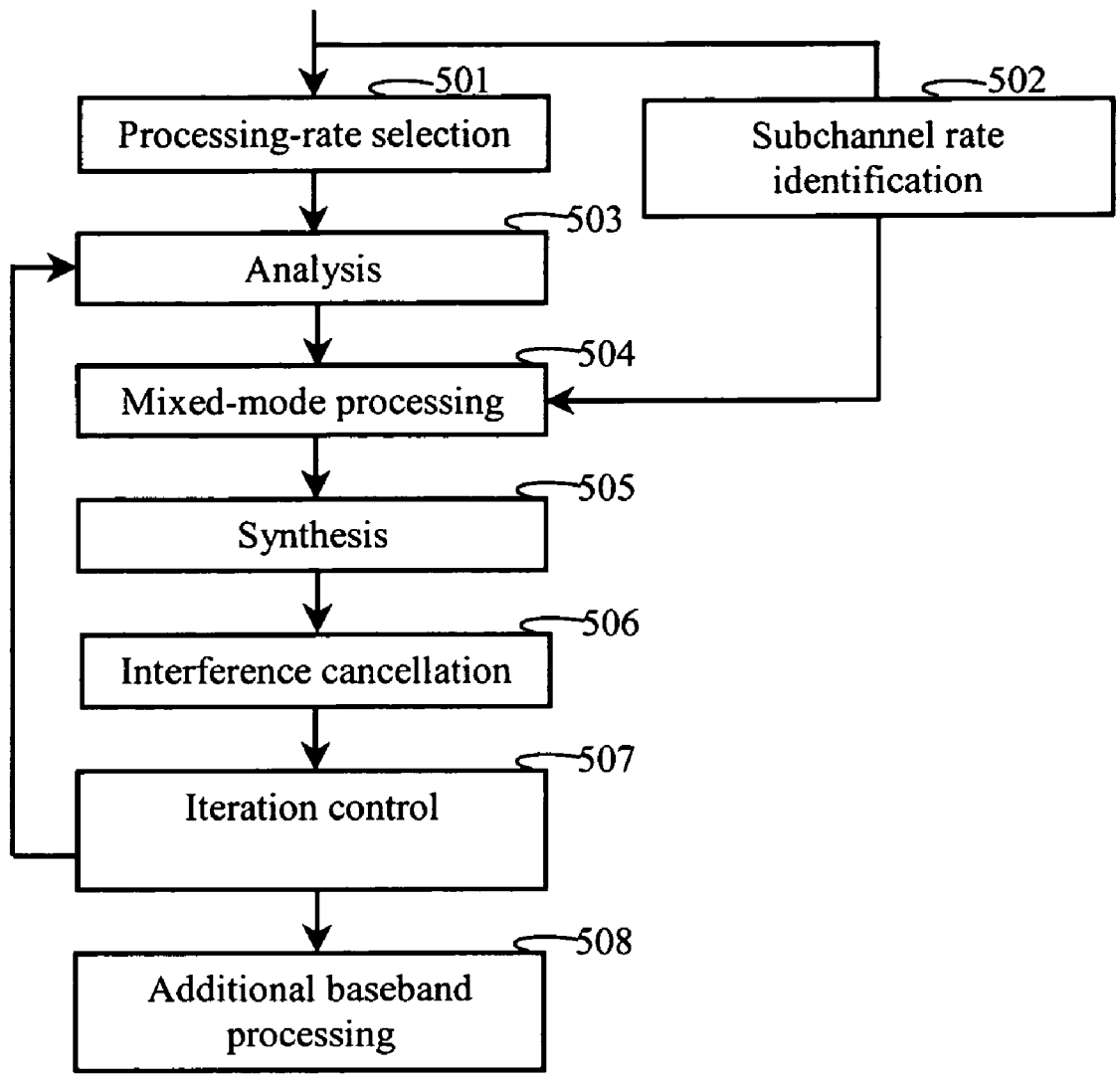
FIG. 5A is a block diagram of an interference canceller in accordance with one embodiment of the invention.

FIG. 5A is a block diagram of an interference canceller in accordance with one embodiment of the invention. A processing-rate selection module 501 analyzes a received baseband signal and selects a processing rate R for analysis and synthesis. A subchannel rate identification module 502 identifies the rates of individual subchannels in the received baseband signal. The received baseband signal is analyzed 503 at the selected rate R for each multipath delay wherein signals corresponding to each subchannel are combined across the multipaths to produce soft estimates. Subchannel rate information and the soft estimates are processed in a mixed-mode processing module 504.

Subchannel symbol estimates are input to a synthesis module 505, which performs weighting, PN scrambling, channel emulation, and transmit-receive filter emulation to produce an estimated interference signal. A cancellation module 506 is configured to cancel estimated interference signal from the received baseband signal for each multipath to produce an interference-cancelled signal. An iteration-control module 507 determines whether to perform another iteration or to output the interference-cancelled signal for additional baseband processing (not shown), such as matched filtering to the code and rate of the SOI, rate matching, de-interleaving, and decoding. Otherwise, control in an iterative loop returns to the analysis module 503.

Figure 5B:
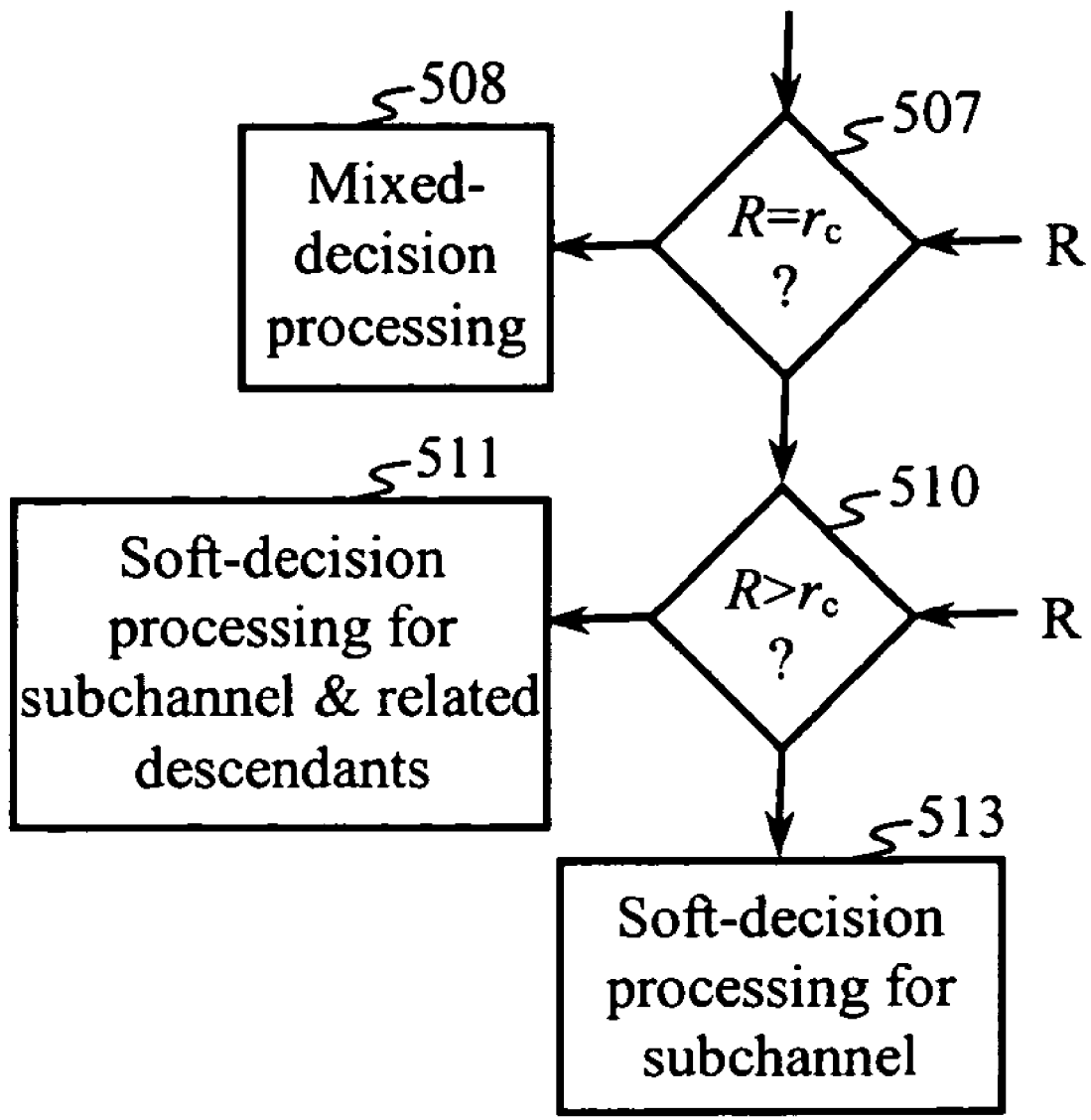
FIG. 5B is a flow chart of an algorithm configured to operate in mixed-decision mode when processing multi-rate subchannels.

FIG. 5B illustrates an algorithm configured to perform the mixed-mode processing step 504 shown in FIG. 5A. An evaluation step 507 processes each subchannel to determine if its rate is equal to the selected processing rate R. If the rates are equal, the corresponding subchannel symbol estimates are processed in a mixed-decision processing step 508. In accordance with one embodiment of the invention, if the SINR of a given subchannel is greater than or equal to a predetermined value, then a hard decision is made. If the SINR is below a predetermined value, a soft decision is made. Alternatively, other signal-quality criteria may be used to choose between hard and soft decisions, including instantaneous estimates of noise realization amplitude and other functions of subchannel SINRs. If the evaluation 507 criterion fails, the subchannel rate is processed by a second evaluation step 510. If the subchannel rate is greater than the processing rate R, soft decisions 511 are made for the subchannel input and for all subchannels that are the descendants of the same ancestor as the current subchannel. If the evaluation 510 criterion fails, then a soft decision is made on the subchannel input 513, as it is the ancestor of at least one lower-rate subchannel. The resulting soft decisions are coupled to the synthesis module 505.

The functions of the various elements shown in the drawings, including functional blocks labeled as "modules" may be provided through the use of dedicated hardware, as well as hardware capable of executing software in association with appropriate software. When provided by a processor, the functions may be performed by a single dedicated processor, by a shared processor, or by a plurality of individual processors, some of which may be shared. Moreover, explicit use of the term "processor" or "module" should not be construed to refer exclusively to hardware capable of executing software, and may implicitly include, without limitation, digital signal processor DSP hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as applying without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A receiver, configured for cancelling interference effects of at least one high-rate subchannel at a low rate in a multi-rate communication system, the receiver comprising:

an analysis module configured for calculating at least one low-rate symbol estimate from at least one low-rate descendant subchannel of the at least one high-rate subchannel in a received signal, and an interference canceller configured for processing the at least one low-rate symbol estimate with the received signal to cancel interference contributed by the at least one high-rate subchannel, wherein the analysis module is configured to sample the at least one high-rate subchannel to ensure that amplitudes of the received signal do not change significantly over a predetermined time interval.

2. A method for cancelling interference effects of at least one high-rate subchannel at a low rate in a multi-rate communication system, the method comprising:

providing for analyzing a received signal to produce at least one low-rate symbol estimate from at least one low-rate descendant subchannel of the at least one high-rate subchannel, and providing for processing the at least one low-rate symbol estimate with the received signal to cancel interference contributed by the at least one high-rate subchannel, wherein providing for analyzing comprises sampling the at least one high-rate subchannel to ensure that amplitudes of the received signal do not change significantly over a predetermined time interval.

3. A method for cancelling interference effects of at least one high-rate subchannel at a low rate in a multi-rate communication system, the method comprising:

providing for analyzing a received signal to produce at least one low-rate symbol estimate from at least one low-rate descendant subchannel of the at least one high-rate subchannel, and providing for processing the at least one low-rate symbol estimate with the received signal to cancel interference contributed by the at least one high-rate subchannel, wherein providing for analyzing further comprises performing mixed-mode processing that uses hard and soft decisions, including comparing a subchannel rate for each subchannel in the received signal to a predetermined processing rate, followed by generating a mix of hard and soft decisions for subchannels having a rate equal to the processing rate and soft-decisions for subchannels having a rate greater than or lesser than the processing rate.

4. A system configured for cancelling interference effects of at least one high-rate subchannel at a low rate in a multi-rate communication system, the system comprising:
an analysis means configured for analyzing the received signal to produce at least one low-rate symbol estimate calculated from at least one low-rate descendant subchannel of the at least one high-rate subchannel, and
an interference-cancellation means configured for processing the at least one low-rate symbol estimate with the received signal to cancel interference contributed by the at least one high-rate subchannel.

5. The system recited in claim 4, wherein the at least one high-rate subchannel comprises at least one code-multiplexed subchannel having a low spreading factor, and the at least one low-rate descendant subchannel comprises at least one code-multiplexed subchannel having a high spreading factor.

6. The system recited in claim 4, wherein the analysis means comprises a Rake-processing means for generating one of a plurality of signals, a combining means configured to weight and combine the plurality of signals to generate a combined signal, a despreading means for generating a despread signal from the combined signal, and a symbol-estimating means configured for generating the at least one low-rate symbol estimate from the combined signal.

7. The system recited in claim 4, wherein the analysis means comprises a sampling means configured for sampling the at least one high-rate subchannel to ensure that amplitudes of a received signal do not change significantly over a predetermined time interval.

8. The system recited in claim 4, wherein the analysis means includes a mixed-mode processing means, configured for comparing a subchannel rate for each subchannel in a received signal to a predetermined processing rate, followed by generating a mix of hard and soft decisions for subchannels having a rate equal to the processing rate and soft-decisions for subchannels having a rate greater than or lesser than the processing rate.

9. The system recited in claim 4, wherein the interference-cancellation means comprises coupling the interference-cancelled signal back to the analysis means to perform iterative interference cancellation.

10. The system recited in claim 4,
wherein the interference-cancellation means comprises a synthesis means comprising
a weighting means for weighting the at least one low-rate symbol estimate for producing at least one weighted symbol estimate,
a spreading means for spreading the at least one weighted symbol estimate to produce at least one spread signal,
a channel-emulation means for performing channel emulation on the at least one spread signal to produce an estimated received signal, and
a combining means for combining a plurality of components of the estimated received signal.

11. A method for processing at least one of high-rate subchannels and low-rate subchannels, the method comprising:
providing for performing at least one of a high-rate analysis and a low-rate analysis for a plurality of coded subchannels in a received baseband signal,
providing for calculating a signal-to-interference-and-noise ratio (SINR) for each of the plurality of coded subchannels, and
providing for employing a function of the SINR for processing high-rate and low-rate subchannels in the received baseband signal,
wherein providing for employing the function comprises calculating a variance of the SINR and determining whether the variance is substantially zero or substantially non-zero.

12. The method recited in claim 11, wherein providing for calculating an SINR is configured for calculating a plurality of low-rate SINRs for a plurality of low-rate subchannels and at least one high-rate SINR for at least one high-rate subchannel, the method further comprising combining the plurality of low-rate SINRs to produce a summed SINR and scaling the at least one high-rate SINR by a ratio of the high rate and the low rate.

13. The method recited in claim 12, further comprising generating first-order statistics from symbol estimates of the plurality of subchannels, and processing the first-order statistics to determine the presence of at least one of a high-rate subchannel and a low-rate subchannel.

14. The method recited in claim 11, further comprising comparing instantaneous symbol estimates to at least one predetermined value for determining the presence of the at least one of high-rate subchannels and low-rate subchannels.

15. An apparatus configured for processing at least one of a high-rate subchannel and a low-rate subchannel in a received baseband signal, comprising:
an analysis module configured for performing at least one of a high-rate analysis and a low-rate analysis for a plurality of subchannels in the received baseband signal,
a signal-to-interference-and-noise ratio (SINR) module configured for calculating an SINR for each of the plurality of subchannels,
a decision module configured for employing a function of the SINR for processing at least one of high-rate subchannels and low-rate subchannels in the received baseband signal, and
a variance calculator configured for estimating an SINR variance and determining whether the SINR variance is substantially zero or substantially non-zero.

16. The apparatus recited in claim 15,
wherein the SINR module is configured for calculating a plurality of low-rate SINRs for a plurality of low-rate subchannels and at least one high-rate SINR for at least one high-rate subchannel,
the apparatus further comprising a combiner configured to sum the plurality of low-rate SINRs to produce a summed SINR and a scaling module configured to multiply the at least one high-rate SINR by a ratio of the high rate and the low rate, to account for spreading gain of non-normalized spreading codes.

17. The apparatus recited in claim 15,
wherein the analysis module comprises
a low-rate analysis block configured to process the received baseband signal for producing low-rate symbol estimates of low-rate descendants of a high-rate subchannel, and
a high-rate analysis block configured to process the received baseband signal at the high rate for producing high-rate symbol estimates.

18. The apparatus recited in claim 17, further comprising
at least one first-order statistics block configured for processing at least one of the low-rate symbol estimates and the high-rate symbol estimates for generating first-order statistics, the decision module further configured for employing the first-order statistics for processing the high-rate subchannels and low-rate subchannels in the received baseband signal.

19. The apparatus recited in claim 15,
wherein the decision module is configured to compare instantaneous symbol estimates from the analysis module to at least one predetermined value for processing the high-rate subchannels and low-rate subchannels in the received baseband signal.

20. The apparatus recited in claim 15, wherein the analysis module comprises a means for equalization configured to generate the at least one low rate symbol estimate from the combined signal.

21. A system configured for processing at least one of a high-rate subchannel and a low-rate subchannel in a received baseband signal, comprising:
an analysis means for performing at least one of a high-rate analysis and a low-rate analysis for a plurality of subchannels in a received baseband signal,
an SINR-calculation means for calculating a signal-to-interference-and-noise ratio (SINR) for each of the plurality of subchannels, and
a detection means for employing a function of the SINR for processing the high-rate and low-rate subchannels in the received baseband signal,
wherein the detection means is configured for calculating a variance of the SINR and determining whether the variance is substantially zero or substantially non-zero.

22. The system recited in claim 21, wherein the SINR-calculation means is configured for calculating a plurality of low-rate SINRs for a plurality of low-rate subchannels and at least one high-rate SINR for at least one high-rate subchannel, the system further comprising a combining means for combining the plurality of low-rate SINRs to produce a summed SINR and a scaling means configured for scaling the at least one high-rate SINR by a ratio of the high rate and the low rate to account for spreading gain of non-normalized spreading codes.

23. The system recited in claim 22, wherein the analysis means is configured to produce low-rate symbol estimates and high-rate symbol estimates, the system further comprising a first-order statistics means configured for processing at least one of the low-rate symbol estimates and the high-rate symbol estimates for generating first-order statistics, the detection means further configured for employing the first-order statistics for processing the high-rate subchannels and low-rate subchannels in the received baseband signal.

24. The system recited in claim 21, wherein the detection means is configured to compare instantaneous symbol estimates produced by the analysis means to at least one predetermined value for processing the high-rate subchannels and low-rate subchannels in the received baseband signal.

25. A method for cancelling interference effects of at least one low-rate subchannel at a high rate in a multi-rate communication system, the method comprising:
providing for analyzing the at least one low-rate subchannel on its high-rate ancestor subchannel for generating symbol estimates,
providing for applying weighted symbol estimates to at least one synthesized high-rate ancestor subchannel to generate a plurality of high-rate interference signals, and using a sequence of the plurality of high-rate interference signals to model the interference effects from a low-rate transmission,
wherein the at least one low-rate subchannel comprises a code-multiplexed subchannel having a high spreading factor, and the high-rate ancestor subchannel comprises a plurality of code-multiplexed subchannels, each having a low spreading factor.

26. A receiver, configured for cancelling interference effects of at least one high-rate subchannel at a low rate in a multi-rate communication system, the receiver comprising:
an analysis module configured for calculating at least one low-rate symbol estimate from at least one low-rate descendant subchannel of the at least one high-rate subchannel in a received signal, and
an interference canceller configured for processing the at least one low-rate symbol estimate with the received signal to cancel interference contributed by the at least one high-rate subchannel,
wherein the interference canceller comprises a synthesis module configured to synthesize the interference by applying the at least one low-rate symbol estimate to at least one synthesized low-rate subchannel.

27. A receiver, configured for cancelling interference effects of at least one high-rate subchannel at a low rate in a multi-rate communication system, the receiver comprising:
an analysis module configured for calculating at least one low-rate symbol estimate from at least one low-rate descendant subchannel of the at least one high-rate subchannel in a received signal, and
an interference canceller configured for processing the at least one low-rate symbol estimate with the received signal to cancel interference contributed by the at least one high-rate subchannel,
where the analysis module comprises at least one equalizer to generate the symbol estimate.

28. A method for cancelling interference effects of at least one high-rate subchannel at a low rate in a multi-rate communication system, the method comprising:
providing for analyzing a received signal to produce at least one low-rate symbol estimate from at least one low-rate descendant subchannel of the at least one high-rate subchannel, and
providing for processing the at least one low-rate symbol estimate with the received signal to cancel interference contributed by the at least one high-rate subchannel,
wherein providing for analyzing comprises performing equalization in order to produce the at least one symbol estimate.

29. A receiver, configured for cancelling interference effects of at least one high-rate subchannel at a low rate in a multi-rate communication system, the receiver comprising:
an analysis module configured for calculating at least one low-rate symbol estimate from at least one low-rate descendant subchannel of the at least one high-rate subchannel in a received signal, and
an interference canceller configured for processing the at least one low-rate symbol estimate with the received signal to cancel interference contributed by the at least one high-rate subchannel,
wherein the analysis module comprises a Rake receiver comprising a plurality of Rake fingers, each of the plurality of Rake fingers assigned to a particular multipath component of the received signal and configured to produce a plurality of despread signals, and
wherein the Rake receiver comprises a combiner configured to combine the plurality of despread signals.

30. A receiver, configured for cancelling interference effects of at least one high-rate subchannel at a low rate in a multi-rate communication system, the receiver comprising:
an analysis module configured for calculating at least one low-rate symbol estimate from at least one low-rate descendant subchannel of the at least one high-rate subchannel in a received signal, and an interference canceller configured for processing the at least one low-rate symbol estimate with the received signal to cancel interference contributed by the at least one high-rate subchannel, wherein the interference canceller comprises at least one weighting module, at least one spreading module, at least one channel emulator, and a combiner.

31. A method for cancelling interference effects of at least one high-rate subchannel at a low rate in a multi-rate communication system, the method comprising:

providing for analyzing a received signal to produce at least one low-rate symbol estimate from at least one low-rate descendant subchannel of the at least one high-rate subchannel, and providing for processing the at least one low-rate symbol estimate with the received signal to cancel interference contributed by the at least one high-rate subchannel, wherein providing for processing further comprises synthesizing the interference by applying the at least one low-rate symbol estimate to at least one synthesized low-rate subchannel.

32. A method for cancelling interference effects of at least one high-rate subchannel at a low rate in a multi-rate communication system, the method comprising:

providing for analyzing a received signal to produce at least one low-rate symbol estimate from at least one low-rate descendant subchannel of the at least one high-rate subchannel, and providing for processing the at least one low-rate symbol estimate with the received signal to cancel interference contributed by the at least one high-rate subchannel, wherein providing for processing comprises coupling the interference-cancelled signal back to the step of providing for analyzing to perform iterative interference cancellation.

* * * * *